June 5, 1956  P. ROBINSON ET AL  2,749,490

ELECTRICAL CONDENSERS

Filed Oct. 22, 1952

INVENTORS
PRESTON ROBINSON
DAVID B. PECK
BY
Connolly and Hutz
THEIR ATTORNEYS

2,749,490

ELECTRICAL CONDENSERS

Preston Robinson and David B. Peck, Williamstown, Mass., assignors to Sprague Electric Company, North Adams, Mass., a corporation of Massachusetts Application October 22, 1952, Serial No. 316,232

2 Claims. (Cl. 317—258)

This invention relates to improved electrical capacitors and more specifically refers to film capacitors characterized by very high insulation resistance and/or capacitance stability. The present application is a continuation-in-part of our U. S. patent applications bearing Serial Numbers 204,546 and 263,866, filed on the 5th of January 1951 and the 28th of December 1951.

Electrical capacitors are of many types, each of which is characterized by some particular property or properties which lead to its use in certain types of electrical circuit applications. There are, however, a number of circuit requirements for which the existing types of capacitors were unsuited prior to the development of special composite dielectric capacitors disclosed in the above mentioned patent applications. One such requirement is a low and controllable temperature coefficient of capacity. For such applications the bulky and expensive mica capacitors have previously been used, being, for practical purposes, limited to the lower capacitance range. For higher capacitance values polystyrene capacitors have met some application requirements for a substantial negative temperature coefficient of capacity, where a very limited operating temperature range can be tolerated.

Another requirement which has become of increasing importance in recent years is the insulation resistance of the capacitor at moderate and at high temperatures. Where capacitors are to be used in circuits for computers, electronically controlled missiles, and the like, the R-C time constant type of circuit is frequently employed. In such an instance it is desirable that the insulation resistance of the capacitor be under all possible operating voltages and temperatures at least two orders of magnitude higher than that of the companion resistor. Otherwise the accuracy of the time constant network is substantially reduced. This problem is particularly aggravated by wide operational temperature limits, particularly those involving temperatures of 125° C. and higher. Paper capacitors are not satisfactory for many of the circuits under consideration.

It is an object of the present invention to overcome the foregoing and related disadvantages. A further object is to produce new and useful electrical capacitors. A still further object is to produce capacitors characterized by extremely low temperature coefficients of capacity combined with high insulation resistance over a wide temperature range. A still further object is to produce capacitors characterized by extremely low temperature coefficients of capacity combined with high insulation resistance over a wide temperature range. A still further object is to produce capacitors capable of operation at high voltages and temperatures without substantial deterioration of the dielectric material.

Additional objects will become apparent from the following description and claims.

These objects are attained in accordance with the present invention wherein there is produced an electrical capacitor comprising convolutely wound electrode elements separated by a composite dielectric spacing material, said material consisting of at least one continuous layer of a predominantly disoriented polyvinyl hydrocarbon film and at least one predominantly oriented linear polyester film.

In a more restricted sense the invention is concerned with an electrical capacitor comprising convolutely wound electrode elements separated by a composite dielectric spacing material, said material consisting of at least one continuous film of disoriented polystyrene and at least one predominantly oriented film of ethylene glycol and terephthalic acid polyester.

In one of its limited embodiments the invention is concerned with an electrical capacitor comprising convolutely wound electrode foils separated by a composite dielectric spacing material, said material consisting of a continuous polystyrene film abutting a continuous polyethylene terephthalate film, the ratio between the thickness of said films being from about 1:3 to about 2:1 respectively.

In our parent applications we have disclosed the wide outlets of the novel combination of a continuous film of a relaxed or at least partially disoriented dielectric film and a fibrous or film type layer which is oriented and/or non-thermoplastic in nature. The present invention relates to a specific type of such a basic construction, namely the novel combination of two substantially continuous dielectric films, one of which is at least partially disoriented, while the other is substantially completely oriented. Properly disposed between electrodes, this combination results in capacitor characteristics of great utility and which were heretofore unattainable.

The partially or completely disoriented continuous film normally consists of a polyvinyl hydrocarbon resin, which may be further substituted. Polystyrene is a typical resin and is preferred. Other suitable resins are polybutadiene, polyvinylnaphthalene, polyvinyltoluene, polyvinylbiphenyl and the like. A further resin which may be employed represents a substituted hydrocarbon polymer, and is polytetrafluoroethylene. These films may consist of layers initially produced as self-supporting dielectrics or may be introduced into the structure by coating of the oriented film discussed in the following paragraph.

As an example of the former process, polystyrene is extruded and oriented by stretching in both linear directions during the curing process. It is then wound into the capacitor structure and disoriented by thermal processing at temperatures ordinarily between the second order transitition point and the melting point. As an example of the second process, a solution of polystyrene in toluene and xylene is deposited upon the oriented base and subsequently the solvent is removed to leave a disoriented and continuous polystyrene film.

The oriented dielectric films are preferably linear in chemical structure and the orientation is ordinarily accomplished through appropriate stretching of the polymer during the film forming process. A typical and preferred polymer of this type is the condensation polymer of ethylene glycol and terephthalic acid. Other polymers include the polyamides, such as nylon; polyurethanes, such as Igamid U, Perlon U, and the reaction products of 1,6-hexane diisocyanate and 1,4-butylene glycol; certain cellulose ethers and esters, such as cellulose acetate, ethyl cellulose, methyl cellulose, and cellulose acetate-sorbate; polyvinyl alcohol; polyacrylonitrile; polyvinylidene chloride; and various halogenated or otherwise substituted derivatives of these resins. It should be pointed out that the insulation resistance and certain other characteristics of this oriented film need not be of the same order of magnitude as that of the disoriented film.

The ratios of the two films employed, that is the disoriented and oriented films, is ordinarily about between about 1:3 and 2:1 and the thickness of individual films and gross dielectric spacer ordinarily from about .2 mil to about 1.0 mil and from about .3 to about 4.0 mils, respectively. These combinations may be produced in any desired manner with at least one layer of each film being employed. For high voltage service it is desirable to employ a total of at least three films and often four or more are employed, with a structure of alternately oriented and disoriented films. Where high temperature applications are encountered, it is ordinarily desirable to sandwich one oriented layer between two disoriented layers.

Impregnation of such capacitor structures is not ordinarily required but may be employed for high voltage capacitors. It reduces the possibility of breakdown and/or corona formation in the marginal and terminal areas. Thermal processing of the wound structure represents an important step in the process, and we ordinarily prefer to process the structure by heating under vacuum from low temperature to a temperature approaching or in some cases exceeding the first order transition point of the resin to be disoriented, and at least 10° lower than the disorientation temperature of the resin which is to remain oriented.

Reference is made to the appended drawing in which—

Figure 1:
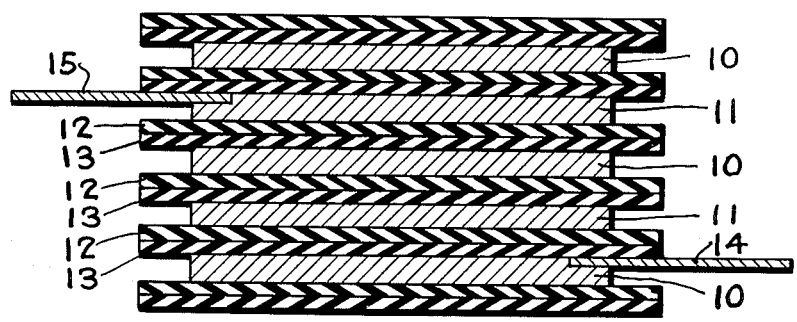
Figure 1 represents a cross-section of a finished capacitor of the invention.

Referring more specifically to Figure 1, 10 and 11 represent convolutely wound electrode foils separated by a composite dielectric consisting of disoriented film 12 and oriented film 13. Terminal tabs 14 and 15 respectively, contact electrode foils 10 and 11.

Figure 2:
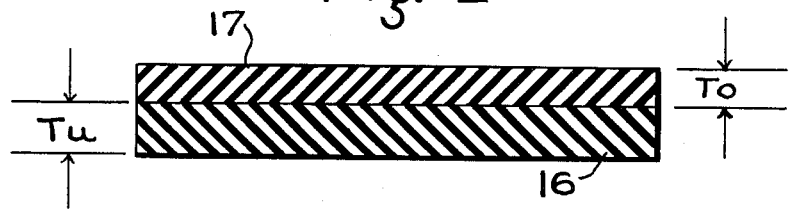
Figure 2 shows one dielectric combination of the invention and Figure 3 shows another dielectric combination of the invention.

Figure 2 shows a cross-section of the composite dielectric spacer of the invention, in which $T_u$ represents the thickness of the disoriented film 16, while $T_o$ represents the thickness of oriented film 17. The ratio between the thickness of these two films has been previously referred to.

Figure 3:
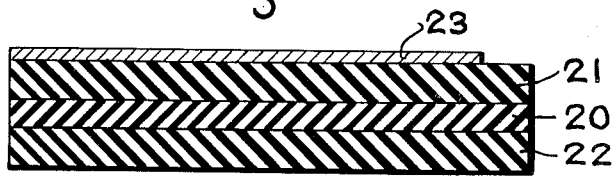

Figure 3 represents a cross-section of a typical combination of dielectric materials in accordance with our invention. 20 represents the disoriented film sandwiched between oriented films 21 and 22. This, representing one of the preferred structures of the invention, is particularly advantageous when higher voltages and/or temperatures are to be encountered.

Metallized electrode 23 is bonded to one surface of dielectric layer 21 to demonstrate the utility of our dielectrics in metallized electrode capacitor structures.

As an example of the practice of our invention, a 4 mfd. capacitor was constructed by connecting in parallel seven individual flattened plastic capacitors produced by convolutely winding a composite dielectric consisting of one layer of oriented polystyrene film .0004" thick between two layers of polyethylene-terephthalate film which were .00025" in thickness. .00025" aluminum foils were used for the electrodes. Each capacitor was placed in a clamp and heated under vacuum to 125° C. where the temperature was held for four hours.

The 4 mfd. capacitor assembled from seven of such units had an insulation resistance of over 40,000 megohm microfarads at 24° C., over 33,000 megohm microfarads at 55° C., over 15,000 megohm microfarads at 85° C., and over 13,000 megohm microfarads at 105° C. The temperature coefficient of capacity was positive to the extent of 125 parts per million per degrees centigrade between 0° C. and +65° C. Even at 100° C. the capacitance change did not exceed 2% of the room temperature value.

As many apparently widely different embodiments of this invention may be made without departing from the spirit and scope hereof, it is to be understood that the invention is not limited to the specific embodiments hereof except as defined in the appended claims.

What is claimed is:

1. An electrical capacitor comprising convolutely wound electrode elements separated by a composite dielectric spacing material, said material consisting of at least one continuous film of disoriented polystyrene and at least one predominantly oriented film of polyethylene terephthalate acid.

2. An electrical capacitor comprising convolutely wound electrode foils separated by a composite dielectric spacing material, said material consisting of a continuous substantially disoriented polystyrene film abutting a continuous substantially oriented polyethylene terephthalate film, the ratio between the thickness of said films being from about 1:3 to about 2:1, respectively.

References Cited in the file of this patent

UNITED STATES PATENTS

| | | |
|---|---|---|
| 2,424,904 | Ruben | July 29, 1947 |
| 2,497,376 | Swallow | Feb. 14, 1950 |
| 2,604,423 | Slotterbeck | July 22, 1952 |
| 2,634,315 | Allison | Apr. 7, 1953 |